(12) United States Patent
Yu

(10) Patent No.: US 10,047,949 B2
(45) Date of Patent: Aug. 14, 2018

(54) APPARATUS AND METHOD FOR CONTROLLING HUMIDITY

(71) Applicant: Electronics and Telecommunications Research Institute, Daejeon (KR)

(72) Inventor: Han Young Yu, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 590 days.

(21) Appl. No.: 14/685,531

(22) Filed: Apr. 13, 2015

(65) Prior Publication Data

US 2015/0300629 A1 Oct. 22, 2015

(30) Foreign Application Priority Data

Apr. 17, 2014 (KR) .................. 10-2014-0046302
Mar. 24, 2015 (KR) .................. 10-2015-0041016

(51) Int. Cl.

| F22B 1/30 | (2006.01) |
|---|---|
| B05B 5/053 | (2006.01) |
| F24F 6/14 | (2006.01) |
| B05B 5/057 | (2006.01) |
| B05B 5/16 | (2006.01) |
| F24F 6/00 | (2006.01) |

(52) U.S. Cl.
CPC .............. *F22B 1/30* (2013.01); *B05B 5/057* (2013.01); *B05B 5/0533* (2013.01); *B05B 5/16* (2013.01); *F24F 6/14* (2013.01); *F24F 2006/008* (2013.01); *F24F 2006/146* (2013.01); *Y02B 30/545* (2013.01)

(58) Field of Classification Search
CPC . F22B 1/30; B05B 5/16; B05B 5/0533; B05B 5/057; F24F 2006/008; F24F 2006/145; Y20B 30/345
USPC .................. 392/324, 392, 333, 338; 219/494
See application file for complete search history.

(56) References Cited

U.S. PATENT DOCUMENTS

| 3,297,484 A * | 1/1967 | Niedrach ................ H01M 8/08 429/485 |
|---|---|---|
| 4,722,773 A * | 2/1988 | Plowman .................. C25B 1/46 204/252 |
| 5,631,099 A * | 5/1997 | Hockaday ......... H01M 8/04291 427/105 |
| 7,503,512 B2 | 3/2009 | Nakada et al. |
| 8,282,028 B2 | 10/2012 | Nakada et al. |
| 2012/0094197 A1 | 4/2012 | Ko et al. |

(Continued)

FOREIGN PATENT DOCUMENTS

| CN | 1798615 A | 7/2006 |
|---|---|---|
| CN | 101410187 A | 4/2009 |

(Continued)

*Primary Examiner* — Mark Paschall (57) ABSTRACT

Humidity control method and apparatus are disclosed. The humidity control apparatus may include a water holding tank for holding water therein, a nozzle positioned adjacent to the water holding tank for escape of the water therethrough, a first electrode connected to the nozzle, and a second electrode positioned opposite to the first electrode. The humidity control apparatus may include a first electrical power control unit for applying a voltage to the first electrode and the second electrode, and a first insulator formed on the second electrode.

20 Claims, 6 Drawing Sheets

(56) References Cited

U.S. PATENT DOCUMENTS

2013/0011508 A1     1/2013  Kim
2013/0313729 A1*   11/2013  Sakai ..................... F24F 6/04
                                                         261/130
2015/0074989 A1*    3/2015  Bose .................. H01M 4/8828
                                                         29/623.5
2015/0364713 A1*   12/2015  Takeda ................. H01L 51/445
                                                         257/40

FOREIGN PATENT DOCUMENTS

CN         101972723 A       2/2011
EP           1564779 A2      8/2005
KR    10-2011-0107218 A      1/2001

* cited by examiner

APPARATUS AND METHOD FOR CONTROLLING HUMIDITY

CROSS-REFERENCE TO RELATED APPLICATION

This application claims priority to and the benefit of Korean Patent Application No. 10-2014-0046302 and 10-2015-0041016 filed in the Korean Intellectual Property Office on Apr. 17, 2014 and Mar. 24, 2015, the entire contents of which are incorporated herein by reference.

BACKGROUND OF THE INVENTION (a) Field of the Invention

The present invention relates to method and apparatus for controlling humidity.

(b) Description of the Related Art

A related art humidity control apparatus adapts a system using an ultrasonic waves or a system based on a heat generating device.

The system based on a heat generating device controls the humidity by using moisture formed as the heat is applied to water. Since the system controls the humidity based on the heat, the system has a drawback in that water evaporation may not be quick, and power consumption is high.

Although the humidity control apparatus which uses the ultrasonic waves is advantageous in that humidifying may quick, the moisture can not be diffused to a large area due to a large water droplet size of the moisture. That is, though the humidity is high in the vicinity of the humidity control apparatus, other areas have low humidity, thereby failing to uniformly control the humidity of a large area.

SUMMARY OF THE INVENTION

The present invention has been made in an effort to provide method and apparatus for controlling humidity having advantages of improved humidifying performance and diffusing moisture to a large area.

Another object of the present invention is intended to provide a method and apparatus for controlling humidity, which may improve humidifying performance and diffuse moisture to a large area.

According to the preferred embodiments of the present invention, a humidity control apparatus is provided. The humidity control apparatus may include a water holding tank for holding water therein, a nozzle positioned adjacent to the water holding tank for escape of the water therethrough, a first electrode connected to the nozzle, a second electrode positioned opposite to the first electrode, a first electrical power control unit for applying a voltage to the first electrode and the second electrode, and a first insulator formed on the second electrode.

The first insulator may have a superhydrophobic property. The first insulator may have a composite structure of a micron structure and a nano structure. The first insulator may have a surface treated with a substance including a fluorine group. If the voltage is applied to the first electrode and the second electrode, water droplets may be emitted from the nozzle, and the water droplets may be repelled at the first insulator into the air.

The nozzle has a fine-sized hole formed therein.

The water holding tank may have a hole formed therein at a position opposite to the nozzle.

The voltage may have a DC or AC mode, and a flow rate of the water droplets emitted from the nozzle may be fixed by physical characteristics of the voltage.

The humidity control apparatus may further include a housing which encloses the water holding tank, and the second electrode may be positioned adjacent to the housing.

The humidity control apparatus may further include a fan positioned at the housing for emitting the water escaped thus to the outside.

The humidity control apparatus may further include a pressurizing unit for applying a pressure to the water holding tank. The humidity control apparatus may further include a third electrode positioned opposite to the second electrode, and a second electrical power control unit for applying a voltage to the second electrode and the third electrode.

The humidity control apparatus may further include a second insulator formed on the second electrode to have the superhydrophobic property.

The second electrode and the first insulator may have a hole formed therein for enabling the water having escaped from the nozzle to pass therethrough.

According to another preferred embodiment of the present invention, a method may be provided for controlling humidity with a humidity control apparatus including a water holding tank for holding water therein. The method may include the steps of providing a nozzle for escape of the water from the water holding tank, applying a voltage to a first electrode connected to the nozzle and a second electrode having an insulator formed thereon, making the water to be emitted in a mode of a water droplets from the nozzle by the applying of the voltage, and making the water droplets to be emitted into the air with the insulator.

The insulator may be formed on the second electrode to have a superhydrophobic property.

The voltage may have an AC or DC mode, and a size or a flow rate of the water droplets may be fixed by physical characteristics of the voltage.

The method may further include the step of applying a pressure to the water holding tank.

The method may further include the step of applying a voltage to the second electrode and a third electrode formed opposite to the second electrode to have an insulator formed thereon.

The insulator formed on the third electrode may have a superhydrophobic property.

According to preferred embodiments of present invention, by using electrospinning by the fine nozzle, humidifying performance may be improved, and a large area may be humidified.

Further, according to preferred embodiments of present invention, since water droplets are fine and the fine water droplets are accelerated and discharged, minimizing use of the fan, noise may be reduced at the time of humidifying.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, in addition, unless explicitly described to the contrary, the word "comprise" and variations such as "comprises" or "comprising" will be understood to imply the inclusion of stated elements but not the exclusion of any other elements.

Throughout this specification and the claims that follow, when it is described that an element is "coupled" to another element, the element may be "directly coupled" to the other element or "electrically coupled" to the other element through a third element.

A humidity control apparatus in accordance with a preferred embodiment of the present invention forms moisture of fine-sized water droplets with electrospinning or electospray. In more detail, the humidity control apparatus in accordance with a preferred embodiment of the present invention may diffuse moisture to a large area owing to high fluidity of nanometer- or micron-sized water droplets formed as a voltage is applied to a nozzle having a fine sized, i.e., a nanometer or micron size, hole structure. The method and apparatus for controlling humidity in accordance with a preferred embodiment of the present invention will be described in detail.

First, referring to FIGS. 1 and 2, a structure of the humidity control apparatus in accordance with a preferred embodiment of the present invention will be described.

Figure 1:
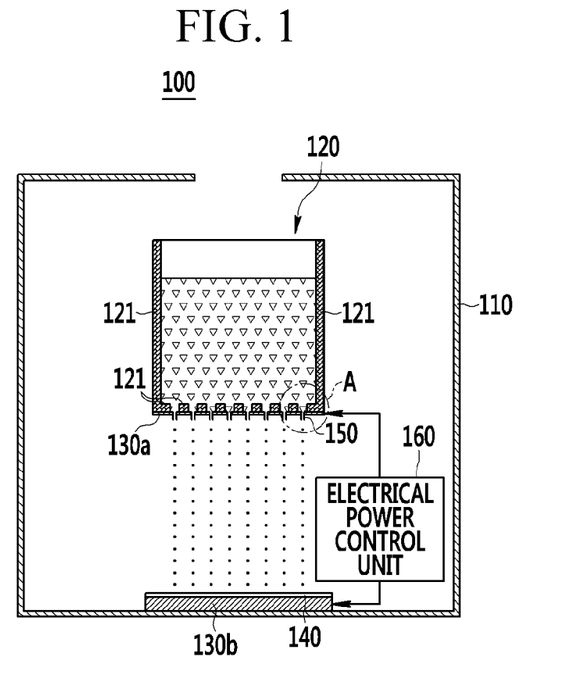
FIG. 1 illustrates a schematic view of a humidity control apparatus in accordance with a preferred embodiment of the present invention.
Figure 2:
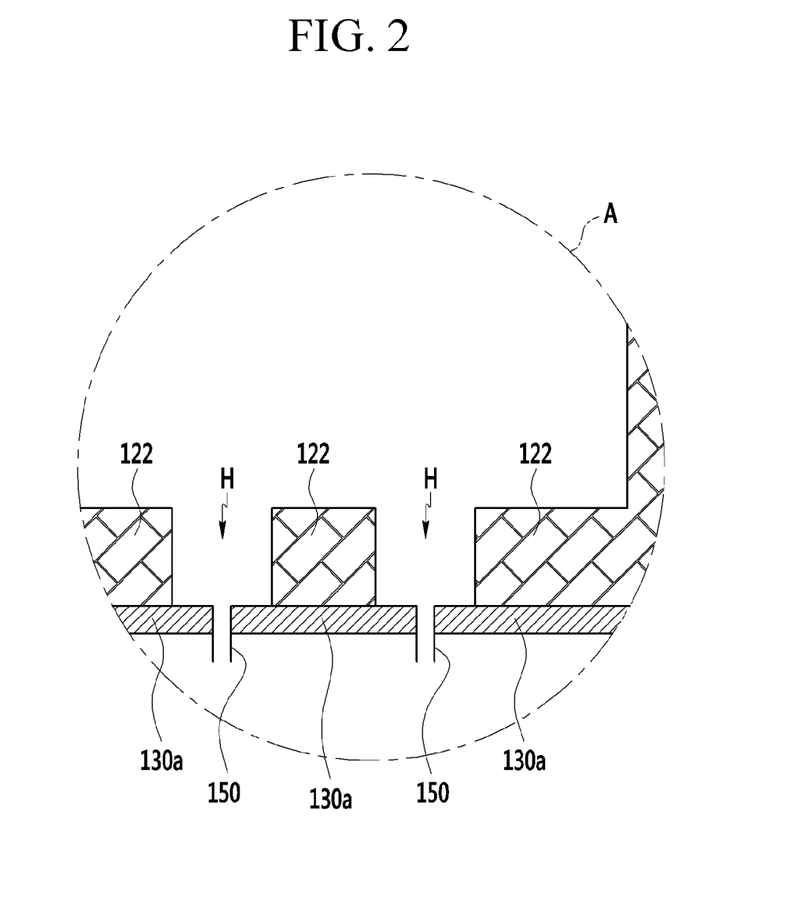
FIG. 2 illustrates an enlarged schematic view of the A part in FIG. 1.

FIG. 1 illustrates a schematic view of a humidity control apparatus 100 in accordance with a preferred embodiment of the present invention, and FIG. 2 illustrates a schematic enlarged view of the A part in FIG. 1.

As shown in FIG. 1, the humidity control apparatus 100 in accordance with a preferred embodiment of the present invention includes a housing 110, a water holding tank 120, electrodes 130a and 130b, an insulator 140, a fine nozzle 150, and electrical power control unit 160.

The housing 110 is a case of the humidity control apparatus 100 which forms an entire exterior appearance of the humidity control apparatus 100. The housing 110 may have a hole formed therein for escape of water droplets to the outside. The hole may be formed in an upper side or a side of the housing.

The water holding tank 120 is provided for holding water which may be filled by a user. The water holding tank 120 includes a side 121 and a bottom 122. As shown in FIG. 2, the bottom 122 has holes H formed therein for escape of the water therethrough. Although not shown in FIGS. 1 and 2, the side 121 may also have holes formed therein for escape of the water therethrough.

The electrode includes a first electrode 130a and a second electrode 130b, and a voltage is applied to the first electrode 130a and the second electrode 130b.

As shown in FIG. 2, the first electrode 130a is positioned at the bottom 122 of the water holding tank 120 connected to the fine nozzle 150, electrically. The first electrode 130a may also have holes for escape of the water droplets therethrough. If the voltage is applied to the first electrode 130a, an electric field is formed between the water in the water holding tank 120 in contact with the fine nozzle 150 and the second electrode 130b, to cause an electrospinning or electrospray. The electric field is formed by the voltage being applied to the first electrode 130a and the second electrode 130b, and the electric field formed thus generates electrostatic force between the water in the water holding tank 120 and the second electrode 130b. The electrostatic force forms the water droplets and emits the water droplets through the fine nozzle 150. Although not shown in FIGS. 1 and 2, the first electrode 130a may also be positioned at the side 121 of the water holding tank 120, and the second electrode may be formed at a position opposite thereto.

The second electrode 130b and the first electrode 130a are formed at positions opposite to each other. Different from the first electrode 130a, the second electrode 130b may have a plate shape positioned opposite to the first electrode 130a. Although not shown in FIG. 1, the second electrode 130b may be additionally formed at the side 121 at a position opposite to the first electrode 130a.

The insulator 140 is formed on the second electrode 130b, and a surface of the insulator 140 has a superhydrophobic property. The superhydrophobic property of the insulator 140 may be embodied by forming the insulator 140 to have a substance structure with the superhydrophobic property or by treating the surface of the insulator 140 with a substance having the superhydrophobic property. Thus, if the surface of the insulator 140 has the superhydrophobic property, the water droplets are not adsorbed on the surface, but are repelled at the surface into the air.

The substance structure having the superhydrophobic property may be in a mode in which a micron structure and a nanostructure are combined. The structure has a three-dimensional micron structure formed initially, and a three-dimensional nanometer structure formed thereon. In this case, the three-dimensional micron structure has a concave or convex form of a micron size. Further, the three-dimensional nanometer structure is a nanometer-sized concave or convex structure on a surface of the three-dimensional micron structure.

The substance having the superhydrophobic property may be a substance including a fluorine F group. By coating the fluorine F group substance on a surface of the insulator 140 having the superhydrophobic property, the superhydrophobic property may be further improved.

The fine nozzles 150 are formed in the bottom 122 for inflow of the water. The fine nozzles 150 are in contact with the water so as to be in contact with electricity. A plurality of the fine nozzles 150 may be formed to form an array. The fine nozzles 150 function as inlets through which the water is emitted. Although not shown in FIGS. 1 and 2, the fine nozzles 150 may also be formed in the side 121.

The fine nozzles 150 may be embodied by a semiconductor process which uses etching and deposition. The fine nozzles 150 may also be embodied by using an existing micro-needle.

The electrical power control unit 160 applies the voltage to the first electrode 130a and the second electrode 130b. The voltage applied by the electrical power control unit 160 may be in an AC or DC mode. A DC mode power source may have a pulse mode, and an AC mode power source may have a mode of a sine wave, a triangular wave, a rectangular wave, or so on.

If the voltage is applied to the first electrode 130a and the second electrode 130 by the electrical power control unit 160, an electric field is formed at the fine nozzle 150 to cause electrospinning or electrospray. The electrospinning or electrospray is a phenomenon in which a liquidus substance is emitted by the force of the electric field (electrostatic force) applied from the outside with the overcome of surface tension of the liquidus substance. If the surface tension is stronger than the electrostatic force, the liquid does not come off the surface. However, if the electrostatic force is stronger than the surface tension, the liquid comes off the surface and is diffused into the air. A size and a flow rate of the liquid emission by the electric field may vary with a size of the fine nozzle 150 and physical characteristics of the voltage applied thus. If the size of the fine nozzle 150 is reduced, and the voltage applied by the electrical power control unit 160 is set in the mode of AC or DC, the size and the flow rate of the water droplets emitted from the fine nozzle 150 may be controlled by changing physical factors, i.e., shape, frequency, and amplitude of the voltage.

Figure 3:
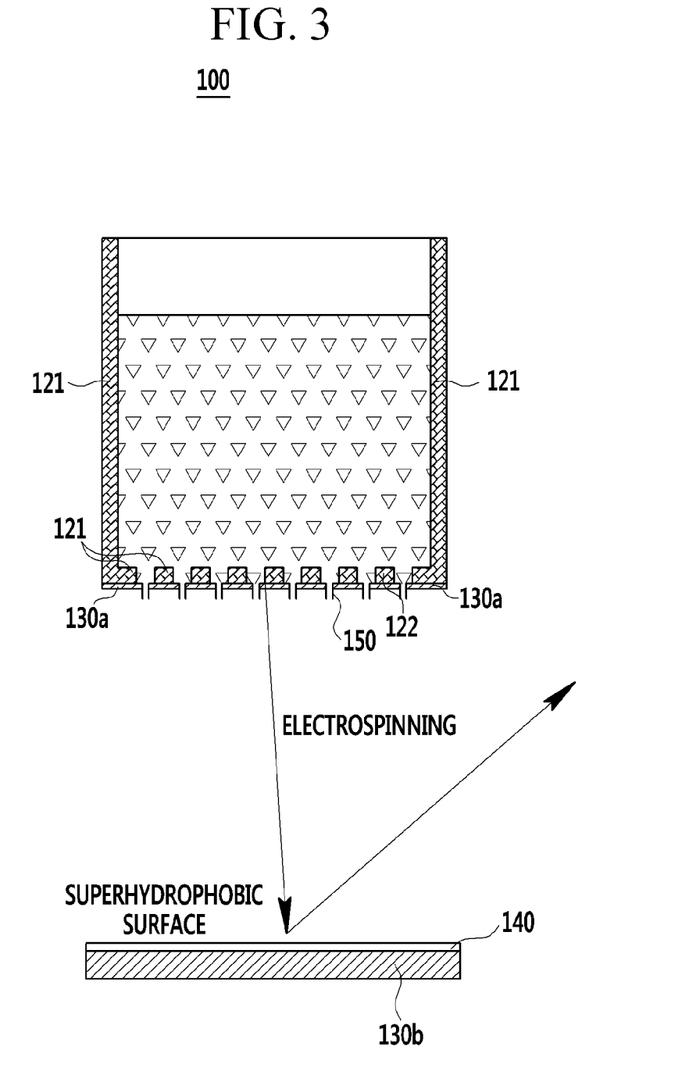
FIG. 3 illustrates a schematic view showing an operation principle of a humidity control apparatus in accordance with a preferred embodiment of the present invention.

FIG. 3 illustrates a schematic view showing an operation principle of a humidity control apparatus 100 in accordance with a preferred embodiment of the present invention.

The electrical power control unit 160 applies a voltage pulse to the first electrode 130a and the second electrode 130b to form an electric field between the fine nozzle 150 and the insulator 140.

The electric field induces the electrostatic force which pushes out the water from the fine nozzle 150.

The water droplets pushed out of the fine nozzle 150 thus are emitted to the second electrode 130b by the electrostatic force. In this case, the strength of the electrostatic force is fixed by strength of the voltage applied by the electrical power control unit 160. That is, shape, frequency, and amplitude of the voltage fix the size and the flow rate of the water droplets.

Since the surface of the insulator 140 has the superhydrophobic property, the water droplets emitted from the fine nozzle 150 do not stick to the insulator 140, but are repelled at the insulator 140. In this way, a few hundred nanometer-sized water droplets may be diffused into the air. This principle is similar to a principle in which a water droplet is repelled by a lotus leaf.

In the meantime, the superhydrophobic surface formed on the surface of the insulator 140 makes the water droplets not spread, but to be in a drop shape, if a contact angle from the superhydrophobic surface is larger than 150°. In this way, the water droplets emitted from the fine nozzle 150 are not spread on the superhydrophobic surface, but are repelled at the superhydrophobic surface, so as to be diffused into the air while maintaining the size of the water droplets.

Since the fine water droplets have a larger surface area than a surface area of micron- or millimeter-sized water droplets, the fine water droplets are brought into contact with the air and easily evaporate. Further, the humidity control apparatus in accordance with a preferred embodiment of the present invention may supply moisture at a substantially higher rate than a moisture supply rate of a related art humidifier. That is, by controlling a number of the fine nozzles, and the shape, the frequency, and the amplitude of the voltage applied thus, a rate of humidifying may be controlled.

Further, the humidity control apparatus 100 in accordance with a preferred embodiment of the present invention may reduce power consumption to lower than that of the related art humidifier. Although strength of the electric field applied to the first electrode 130a and the second electrode 130b is a few kilovolts which is high, since there is almost no current flowing between the first electrode 130a and the second electrode 130b, the power consumption is very low.

The humidity control apparatus 100 in accordance with a preferred embodiment of the present invention may also minimize noise. That is, by eliminating the ultrasonic waves and a fan which cause the noise at the related art humidity control apparatus, the noise may be minimized Since a water particle emitted from the fine nozzle 150 has a nanometer or micrometer size, which is smaller than the related art ultrasonic wave system, the water particle has excellent fluidity. Therefore, the humidity control apparatus in accordance with a preferred embodiment of the present invention may uniformly control humidity of a large area with a fan even if low power is applied to a humidity control apparatus with the fan, or without a fan.

The humidity control apparatus 100 in accordance with a preferred embodiment of the present invention may have high humidifying capability. That is, by controlling a number of the fine nozzles 150, the humidity control apparatus may have high humidifying capability even with the same power as the related art humidifier.

Figure 4:
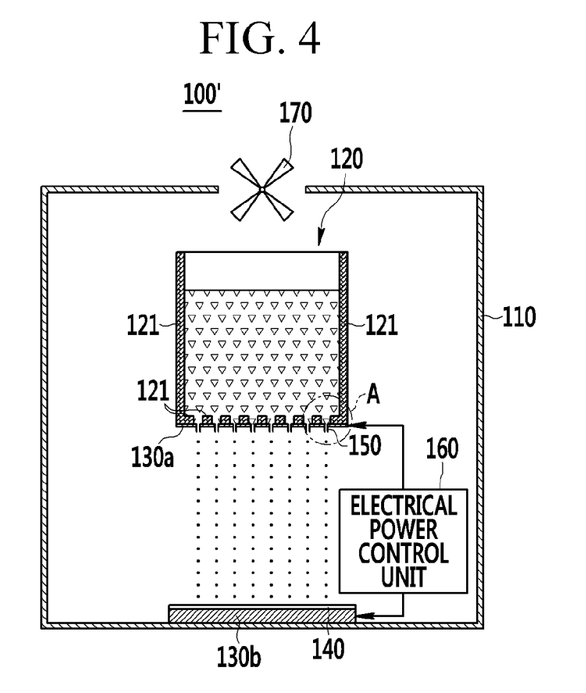
FIG. 4 illustrates a schematic view of a humidity control apparatus in accordance with another preferred embodiment of the present invention.

FIG. 4 illustrates a schematic view of a humidity control apparatus 100' in accordance with another preferred embodiment of the present invention.

As shown in FIG. 4, the humidity control apparatus 100' in accordance with another preferred embodiment of the present invention is identical to the humidity control apparatus 100 in FIG. 1 except for addition of a fan 170 thereto.

The fan 170 is mounted to a top side of the housing 110. Further, different from FIG. 4, the fan 170 may be mounted to the side of the housing 170. The fan 170 is driven by a motor for emitting the water droplets to the outside.

Figure 5:
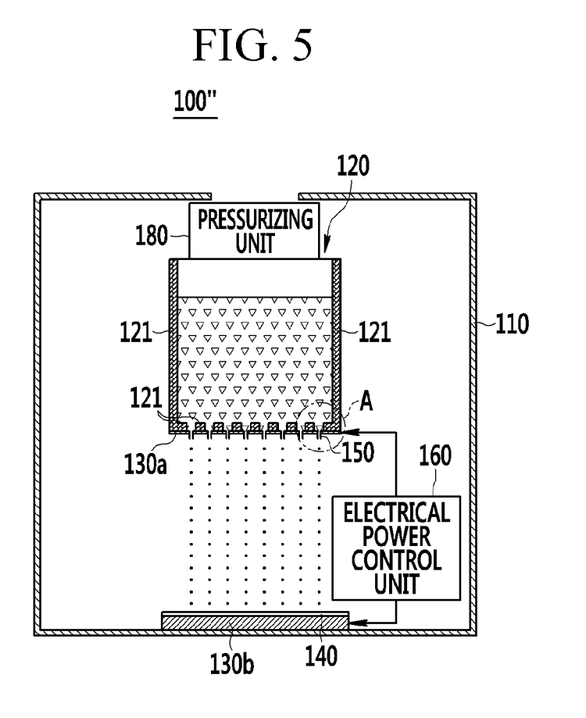
FIG. 5 illustrates a schematic view of a humidity control apparatus in accordance with another preferred embodiment of the present invention.

FIG. 5 illustrates a schematic view of a humidity control apparatus 100" in accordance with another preferred embodiment of the present invention.

As shown in FIG. 5, the humidity control apparatus 100" in accordance with another preferred embodiment of the present invention is identical to the humidity control apparatus 100 in FIG. 1 except for addition of a pressurizing unit 180 thereto.

It may not be easy for the humidity control apparatus 100 in FIG. 1 to emit the water droplets. Emitting of the water droplets formed by a difference of the surface tension and the electrostatic force may not be easy due to high surface tension. In order to supplement this, as shown in FIG. 5, the pressurizing unit 180 pressurizes the water holding tank 120, making emitting of the water droplets easy.

As the pressurizing unit 180 adds a pressure to the water holding tank 120, a pressure throughout the water holding tank 120 is elevated, causing force being applied to the water droplets to increase. With this, the water droplets may be emitted even with a low voltage. The pressurizing unit 180 may be embodied with a pump or the like, and since a method for pressurizing the water holding tank 120 with the pressurizing unit 180 is known to persons in this field of art, detailed description will be omitted.

Figure 6:
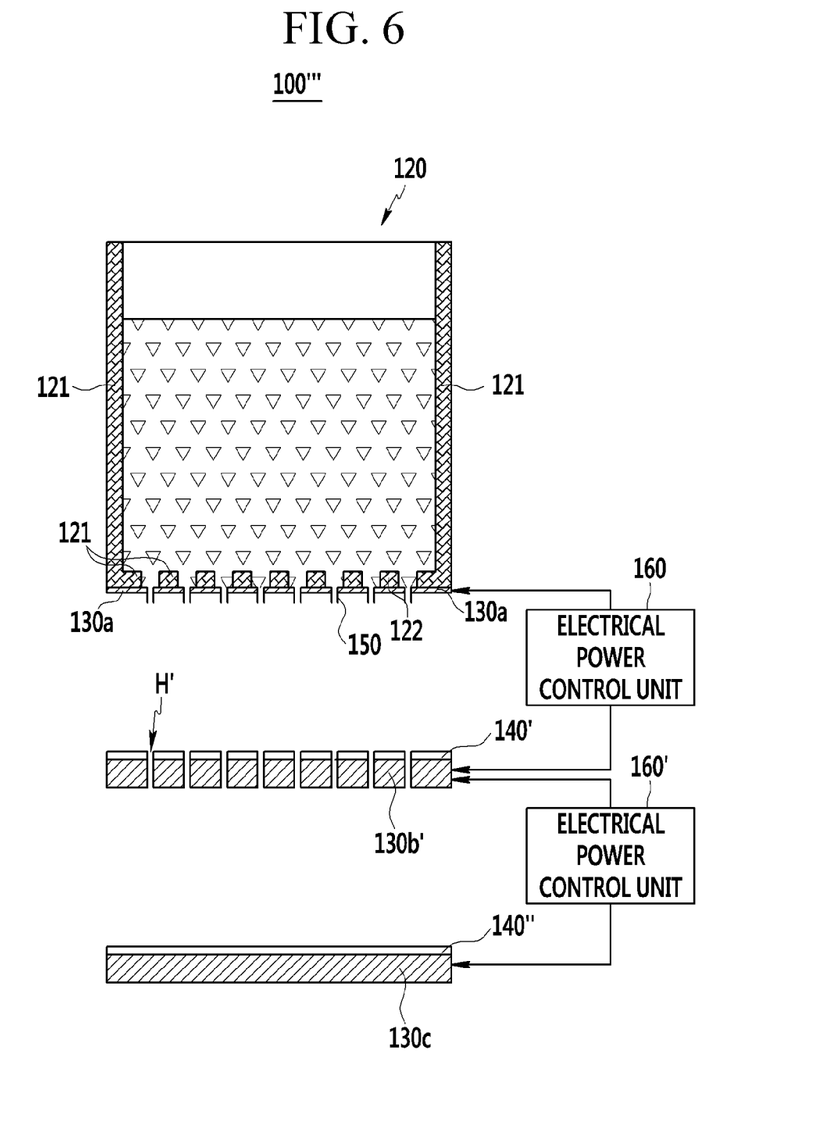
FIG. 6 illustrates a schematic view of a humidity control apparatus in accordance with another preferred embodiment of the present invention.

FIG. 6 illustrates a schematic view of a humidity control apparatus 100''' in accordance with another preferred embodiment of the present invention.

As shown in FIG. 6, the humidity control apparatus 100''' in accordance with a preferred embodiment of the present invention is identical to the humidity control apparatus 100 in FIG. 1 except that the second electrode 130b' and the insulator 140' have different shapes and a third electrode 130c and an insulator 140" are added thereto.

Different from FIG. 1, the second electrode 130b' and the insulator 140' have a hole H' formed therein for enabling the water droplets to pass. As shown in FIG. 6, the second electrode 130b' and the insulator 140' may have a plurality of holes H' formed therein, or may have a central opening. That is, the second electrode 130b' and the insulator 140' may have a net shape for enabling the water droplets to pass therethrough or an annular shape with an opened center.

As shown in FIG. 6, the humidity control apparatus 100''' in accordance with the preferred embodiment of the present invention has the third electrode 130c, an insulator 140" and an electrical power control unit 160' added thereto. The third electrode 130c is an accelerating electrode for accelerating the water droplets having passed through the second electrode 130b'. The insulator 140" has the same function as the insulator 140 in FIG. 1, and the insulator 140" has a surface with a superhydrophobic property. The electric power control unit 160' applies a voltage to the second electrode 130b' and the third electrode 130c. The voltage applied by the electrical power control unit 160' may be in a mode of AC or DC.

The water droplets are discharged from the fine nozzle 150 by the voltage applied by the electrical power control unit 160, and some of the water droplets emitted thus are diffused into the air by the insulator 140'. The rest of the water droplets emitted from the fine nozzle 150 pass through the hole H', and the water droplets having passed through the hole H' thus are further accelerated by the electrical power control unit 160'. The water droplets accelerated thus are repelled into the air by the insulator 140", discharging the water droplets to the outside more easily.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A humidity control apparatus comprising:
a water holding tank holding water therein;
a first electrode disposed on a surface of the water holding tank and having a hole;
a second electrode positioned opposite to the first electrode;
a first electrical power control unit applying a voltage to the first electrode and the second electrode;
a nozzle coupled to the hole of the first electrode and emitting water droplets to the second electrode in response to the applied voltage; and
a first insulator disposed on the second electrode and electrically insulating the second electrode.

2. The humidity control apparatus of claim 1, wherein the first insulator has a superhydrophobic property.

3. The humidity control apparatus of claim 2, wherein the first insulator has a composite structure of a micron structure and a nano structure.

4. The humidity control apparatus of claim 2, wherein the first insulator has a surface treated with a substance including a fluorine group.

5. The humidity control apparatus of claim 2, wherein, when the voltage is applied to the first electrode and the second electrode, the water droplets are emitted from the nozzle, and the water droplets are repelled at the first insulator into air.

6. The humidity control apparatus of claim 1, wherein the nozzle has a fine-sized hole formed therein.

7. The humidity control apparatus of claim 1, wherein the water holding tank has a hole formed therein, the hole of the water holding tank corresponding to the hole of the first electrode.

8. The humidity control apparatus of claim 1, wherein the voltage has a DC or AC mode, and a flow rate of the water droplets discharged from the nozzle is fixed by physical characteristics of the voltage.

9. The humidity control apparatus of claim 1, further comprising a housing which encloses the water holding tank, and wherein the second electrode is positioned adjacent to the housing.

10. The humidity control apparatus of claim 9, further comprising a fan positioned at the housing discharging the water droplets to outside of the housing.

11. The humidity control apparatus of claim 1, further comprising a pressurizing unit applying a pressure to the water holding tank.

12. The humidity control apparatus of claim 1, further comprising:
a third electrode positioned opposite to the second electrode; and
a second electrical power control unit applying a voltage to the second electrode and the third electrode.

13. The humidity control apparatus of claim 12, further comprising a second insulator disposed on the third electrode to have a superhydrophobic property.

14. The humidity control apparatus of claim 13, wherein each of the second electrode and the first insulator has a hole formed therein causing the water droplets emitted from the nozzle to pass therethrough.

15. A method for controlling humidity with a humidity control apparatus including a water holding tank for holding water therein, the method comprising:
applying a first voltage to a first electrode and a second electrode, the second electrode having a first insulator disposed thereon, the first insulator electrically insulating the second electrode;
mitting water droplets from the nozzle to the second electrode by the application of the first voltage;
repelling the emitted water droplets into air by the first insulator; and
applying a second voltage to the second electrode and a third electrode, the third electrode being disposed opposite to the second electrode and having a second insulator disposed thereon, the second insulator electrically insulating the third electrode.

16. The method of claim 15, wherein the first insulator has a superhydrophobic property.

17. The method of claim 15, wherein the voltage has an AC or DC mode, and a size or a flow rate of the water droplets is fixed by physical characteristics of the voltage.

18. The method of claim 15, further comprising applying pressure to the water holding tank.

19. The method of claim 15, wherein the second insulator has a superhydrophobic property.

20. The humidity control apparatus of claim 1, wherein the nozzle includes a portion protruding from an outer surface of the first electrode.

* * * * *